United States Patent [19]

Utner

[11] 4,264,549

[45] Apr. 28, 1981

[54] PROCESS FOR BATCH-COATING OF ELECTRIC COMPONENTS

[75] Inventor: Ferdinand Utner, Regensburg, Fed. Rep. of Germany

[73] Assignee: Siemens Aktiengesellschaft, Berlin & Munich, Fed. Rep. of Germany

[21] Appl. No.: 49,569

[22] Filed: Jun. 18, 1979

[30] Foreign Application Priority Data

Jul. 11, 1978 [DE] Fed. Rep. of Germany ....... 2830472

[51] Int. Cl.³ ............................ B29C 5/00; B29D 3/00
[52] U.S. Cl. ........................................ 264/69; 264/156; 264/157; 264/213; 264/272; 264/278; 264/279; 264/297; 264/313; 264/338
[58] Field of Search ............... 264/157, 272, 277, 275, 264/279, 293, 297, 304, 313, 278, 69, 161, 162, 163, 333, 156, 213, 338

[56] References Cited

U.S. PATENT DOCUMENTS

| | | | |
|---|---|---|---|
| 1,989,702 | 2/1935 | Leguillon | 425/219 |
| 2,436,597 | 2/1948 | Otis | 249/94 |
| 2,763,049 | 9/1959 | Peebles | 264/316 |
| 2,964,800 | 12/1960 | Dorsett | 264/316 |
| 3,076,230 | 2/1963 | Parker et al. | 249/112 |
| 3,658,971 | 4/1972 | Schickedanz | 264/334 |
| 3,890,420 | 6/1975 | Neward | 264/278 |

FOREIGN PATENT DOCUMENTS 1078651 10/1960 Fed. Rep. of Germany .
712289 7/1954 United Kingdom .

Primary Examiner—W. E. Hoag
Attorney, Agent, or Firm—Hill, Van Santen, Steadman, Chiara & Simpson

[57] ABSTRACT

A process for simultaneously batch-coating a number of electric components having radial connections wires extending in approximately parallel relation from the element to be covered utilizes a plate having a hole pattern therein for receiving the wires to retain the elements during coating. A synthetic foil is first placed over the plate and the wires are forced through the foil into the holes. A grid having openings therein formed by perpendicular walls for surrounding the elements is placed over the plate for use as a casting mold. A casting resin is deposited over the grid in excess quantity, and is then smoothed by moving a doctor over the grid. After the resin has hardened, the grid is removed and the individual elements, with the resin adhering to the synthetic foil, are separated.

4 Claims, 2 Drawing Figures

PROCESS FOR BATCH-COATING OF ELECTRIC COMPONENTS

BACKGROUND OF THE INVENTION

1. Field of the Invention

The present invention relates to a process to be used in the manufacture of electric components, and particularly a process for simultaneously coating a batch of electric components with resin.

2. Description of the Prior Art

It is well known in the electronics industry to coat individual electrical components, such as resistors, capacitors, diodes and the like, with a suitable compound in order to prevent moisture from affecting the operation of the operative portion of the component, and in general to protect the component from shock or other stress. Various types of synthetic resins known in the art can be applied in a viscous fluid form to coat the components, and possess suitable imperviousness to moisture and material strength when hardened.

A problem in coating such electrical components which have lead wires extending therefrom is to coat the component while leaving the lead wires uncovered so that the components can be inserted in a circuit board without the necessity of the additional step of stripping the leads of resin. This is particularly a problem if the leads extend downwardly from a base of the component, because the base of the component must be covered with resin to the same extent as the remainder of the component.

It is known in the art to apply synthetic resin in a viscous fluid form to a mold containing a number of components clampingly held therein by their individual lead wires. Such a method and apparatus is usable only to coat components having lead wires extending from the ends thereof, because no protection would be provided to prevent the resin from flowing over the leads of components which extend from a base of the component.

It is also known in the art to coat a batch of individual electrical components having leads extending from the base of each component by inserting the leads in a flexible sheet, such as one made of silicon rubber, and introducing the entire sheet into a casting mold. Such a sheet must be designed to be relatively soft, so that the lead wires can be pressed or inserted therein, thereby allowing only very rough control of the evenness of the coating applied over the base. The process also does not guarantee exact centering of the component to be coated in the mold, so that an uneven coating is made even more likely. Efficient casting with viscous casting material is thus not possible utilizing any of the processes known in the art.

SUMMARY OF THE INVENTION

In accordance with the principles of the present invention a plate having a hole pattern therein for receiving the individual lead wires from a batch of electrical components is utilized to hold the components in place during casting. The plate is covered prior to insertion of the component leads with a synthetic foil and the leads are inserted through the foil and received in the holes in the plate. When the viscous resin is applied, the foil not only provides a sealing relation between the leads and the resin, but also prevents flow of resin into the holes in the plate, so that the portion of the leads received in the holes remains resin-free.

After the individual components are positioned in the plate, a grid is placed over the plate having generally perpendicular walls forming a number of openings corresponding to the number of components, for receiving and surrounding each component. The casting resin is then poured over the top of the grid and allowed to completely flow into and fill each opening therein to coat the components. An excess amount of resin is deposited over the grid and the excess is subsequently scraped off by a vibrating doctor which is moved over the top of the grid.

The top of each component is disposed below the top of the grid, so that a layer of resin remains over the component as the excess is scraped off.

After hardening, the grid is removed and the individual components are removed from the plate and separated, each component retaining a portion of the synthetic foil which adheres to the resin thereon.

Before removing the grid, the elements still contained therein may be stamped with a manufacturer's label or electrical designation on the tops thereof. Stamping the components while still supported in the grid openings lessens the chance of structural damage due to the stamp.

It is accordingly an object of the present invention to provide a process for coating a large number of electrical elements to produce uniform, thin wall thicknesses utilizing viscous casting resin.

It is another object of the present invention to provide a efficient casting method for coating a large number of electrical elements which protects the electrical leads thereof from covering by the resin, and provides a sealing relation between the hardened resin and the leads.

A final object of the invention is to provide a method for covering a large number of electrical elements with protective resin and for stamping the electrical or manufacturer's designations on the elements without structural damage thereto.

DESCRIPTION OF THE PREFERRED EMBODIMENTS

Figure 1:
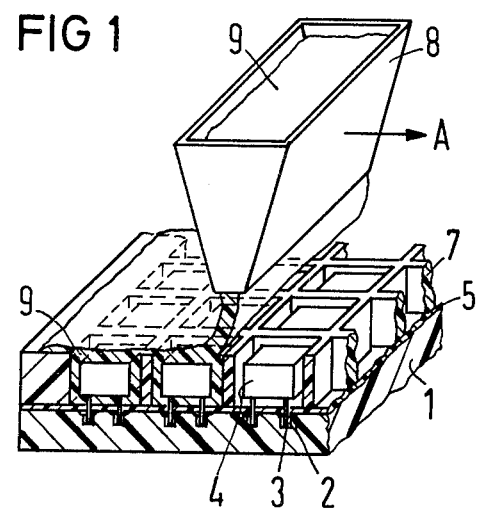
FIG. 1 is a perspective view, partly in section, of a method in accordance with the principles of the present invention for applying viscous resin to coat a number of pre-positioned electrical components.

A method for coating a number of electrical components having generally parallel lead wires extending from a base thereof with viscous resin is shown in FIG. 1. Each individual component 4 has downwardly extending electrical leads 3 thereon which are inserted in respective holes 2 in a plate 1.

The plate 1 is covered with a synthetic foil 5, covering the holes 2, and the lead wires 3 are pushed through the foil 5 to be received in the holes 2. The holes 2 may be widened at the top, shown at 6, such as by countersinking, to make insertion of the leads 3 easier.

After each component 4 has been inserted through the foil 5 and received in the plate 1, a grid 7 is placed on top of the foil layer 5 surrounding the components 4. The grid 7 has generally perpendicular intersecting walls which form individual openings each receiving one component 4. The grid 7 is mechanically locked in position on the plate 1.

After positioning the grid 7, a trough 8 containing a suitable synthetic resin 9 is moved over the grid-component-plate configuration in the direction of arrow A. The trough 8 and means for applying the resin 9 are known in the art.

Figure 2:
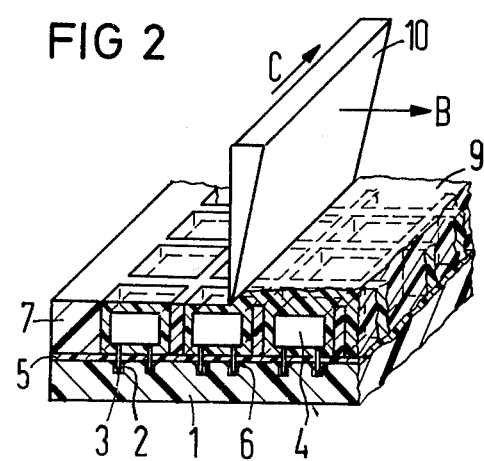
FIG. 2 is a perspective view, partly in section, of a step in the process of FIG. 1 for removing excess resin.

The amount of resin 9 covering the grid 7 is liberally applied so that an excess of resin 9 extends above the grid 7. As shown in FIG. 2, a doctor 10 is moved over the grid 7 after the resin 9 has been deposited thereon to smooth and flatten the portion of resin above each component 4, and to remove excess resin. The tops of the components 4 are disposed beneath the top of the grid 7, so that as the doctor 10 moves over the grid 7 a layer of resin remains over the component 4. The doctor 10 may also be vibrated in the direction of arrow C as it is moved over the grid 7 to further facilitate smoothing and removal of the resin 9.

After the resin 9 has hardened the grid 7 is removed and the foil layer 5 is removed from the plate 9 with the components 4 still adhering thereto. The components are then separated by cutting the foil 5, leaving portions of the foil 5 still adhering to each component 4. These portions of foil provide a sealing relation to prevent entry of moisture through the hardened resin 9 at the points where the leads 3 enter the resin. The foil 5 may be of a composition such that it can be deep-drawn with the application of heat to pull the foil 5 around the leads 3, thereby providing an improved seal.

The holes 2 in the plate 1 are drilled to a depth so that when the leads 3 are inserted therein to the bottom, the component 4 will be positioned a proper distance above the plate 1.

Before removing the grid 7, after the resin 9 has hardened, each now covered component 4 may be stamped with a manufacturer's label or other electrical designation. When such stamping is carried out while the components 4 remains supported by the grid 7, structural damage to the hardened resin 9 and the internal portion of the components 4 is less likely.

Although modifications and changes may be suggested by those skilled in the art it is the intention of the inventor to embody within the patent warranted hereon any such changes and modifications as reasonably and properly come within the scope of his contribution to the art.

I claim as my invention:

1. A process for simultaneously coating a large number of electrical components having downwardly extending leads thereon with viscous resin comprising the steps of:

providing a rigid plate having a hole pattern therein for receiving a portion of each of said leads for substantially immovably laterally and vertically positioning said components in spaced relation on said base;

covering said hole pattern with a synthetic foil layer;

inserting said leads into said holes through said synthetic foil layer so that each lead extends to a bottom of each hole;

placing a grid having openings therein over said foil layer to contain and surround each component in respective openings;

locking said grid in position with respect to said plate;

applying viscous synthetic resin over said grid to fill said openings in said grid;

removing excess resin from said grid;

hardening said resin;

removing said grid;

removing said components and foil layer from said plate; and separating said components.

2. The process of claim 1 including the additional step of stamping each component with an electrical designation after hardening said resin and before removing said grid.

3. The process of claim 1 wherein the step of removing excess resin from said grid consists of moving a doctor in a first direction across said grid to scrape and level said resin.

4. The process of claim 3 wherein the step of removing excess resin from said grid includes the additional step of vibrating said doctor adjacent said grid in a direction perpendicular to said first direction of movement of said doctor over said grid.

* * * * *